(12) United States Patent
Senez, Jr.

(10) Patent No.: US 8,033,459 B2
(45) Date of Patent: Oct. 11, 2011

(54) SYSTEM AND METHOD FOR SECURE ELECTRONIC DATA DELIVERY

(76) Inventor: Raymond C. Senez, Jr., Winnipeg (CA)

(*) Notice: Subject to any disclaimer, the term of this patent is extended or adjusted under 35 U.S.C. 154(b) by 1092 days.

(21) Appl. No.: 11/498,248

(22) Filed: Aug. 3, 2006

(65) Prior Publication Data
US 2007/0033400 A1 Feb. 8, 2007

Related U.S. Application Data

(60) Provisional application No. 60/706,020, filed on Aug. 8, 2005.

(51) Int. Cl.
*G06K 5/00* (2006.01)
(52) U.S. Cl. .......................... 235/382; 235/380
(58) Field of Classification Search .................. 235/380, 235/382, 379; 705/51
See application file for complete search history.

(56) References Cited

U.S. PATENT DOCUMENTS

| | | | | |
|---|---|---|---|---|
| 5,191,611 | A * | 3/1993 | Lang | 705/53 |
| 6,314,425 | B1 * | 11/2001 | Serbinis et al. | 707/10 |
| 7,007,170 | B2 * | 2/2006 | Morten | 713/193 |
| 7,257,581 | B1 * | 8/2007 | Steele et al. | 707/10 |
| 2006/0085355 | A1 * | 4/2006 | Coley et al. | 705/59 |
| 2006/0253340 | A1 * | 11/2006 | Levchin et al. | 705/26 |

* cited by examiner

*Primary Examiner* — Ahshik Kim
(74) *Attorney, Agent, or Firm* — Ryan W. Dupuis; Kyle R. Satterthwaite; Ade & Company Inc.

(57) ABSTRACT

Electronic data is securely delivered from an issuer to a recipient, in the form of an encrypted object. Data belonging to the issuer to be delivered is first selected and then encrypted into the object. The object is registered with a transaction archive for tracking the object prior to transmitting the object to the recipient. Upon receipt, the recipient is prompted for an access code. Attempts to enter the access code by the recipient are registered with the transaction archive. The data is displayed to the recipient only after a correct access code has been entered and only after an attempt to enter the access code by the recipient is registered with the transaction archive.

18 Claims, 10 Drawing Sheets

File Decryption Process

SYSTEM AND METHOD FOR SECURE ELECTRONIC DATA DELIVERY

This application claims the benefit under 35 U.S.C. 119(e) of U.S. provisional application Ser. No. 60/706,020, filed Aug. 8, 2005.

FIELD OF THE INVENTION

The present invention relates to system and method for delivering electronic data from an issuer to a recipient in a secure and traceable manner in which the issuer can confirm delivery to the recipient.

BACKGROUND

The process of signing for a conventional sealed package being delivered is simple and has been in place for years through the Post Office and more recently through courier services. The process simply involves taking an item, putting it in a package and delivering it to its destination. The recipient then signs for the item and the signature is reported back to the sender. It exists in the real world, yet there is no effective or comparable system in the fast paced world of the internet. The problem is large, virtually every company in the world stores confidential data on its computer systems. Email delivers billions of messages around the world in an instant. Yet only a small fraction of this information is protected and an even smaller amount of this data is traceable.

SUMMARY

The solution to the problem of securely transmitting and tracking electronic data is a Secure, Signed, Traceable Data Object (SSTDO) as described herein. An SSTDO is self contained computer application and data component which has been protected with the latest available data encryption algorithms, signed with a Public Key encryption process (PKI) (reference incorporated herein by reference http://ospkibook-.sourceforge.net/docs/OSPKI-2.4.7/OSPKI-html/ospki-book.htm) delivered by any current means of data transport wherein delivery is tracked prior to exposing the data to the end user (program or human).

According to one aspect of the present invention there is provided a method for secure delivery of electronic data from an issuer to a recipient, the method comprising:
 selecting data belonging to the issuer to be delivered;
 encrypting the data into an object;
 registering the object with a transaction archive for tracking the object;
 transmitting the object to the recipient;
 prompting the recipient for an access code;
 registering attempts to enter the access code by the recipient with the transaction archive; and
 displaying the data to the recipient only after a correct access code has been entered.

According to a second aspect of the present invention there is provided a method for secure delivery of electronic data from an issuer to a recipient, the method comprising:
 selecting data belonging to the issuer to be delivered;
 placing the data into an object;
 registering the object with a transaction archive for tracking the object;
 transmitting the object to the recipient;
 registering attempts to access the data by the recipient with the transaction archive; and
 displaying the data to the recipient only after an attempt to access the data by the recipient is registered with the transaction archive.

By displaying the data to the recipient only after a correct access code has been entered while registering all attempts to enter the access code by the recipient, tracking of the delivery of the object is ensured prior to a recipient being able to view the data. By decrypting the data only after a correct access code has been registered with the transaction archive, security of the transaction is also ensured.

The issuer may be verified to the recipient using a certificate authority.

A digital certificate in unencrypted form is preferably attached to the data encrypted into the object.

Access to the transaction archive is preferably restricted to only the issuer.

A data packager may be encrypted into the object which permits the recipient to encrypt information into an object to be returned back to the issuer.

The data may be encrypted into the object using a private and public key pair.

The object is preferably disabled responsive to repeated attempts to enter an invalid access code.

The method of encryption may include registering the access code with a secure server and authenticating the recipient with the secure server to provide the recipient with the access code.

When a plurality of objects are transmitted to the recipient with each object having a respective access code associated therewith, the recipient may be authenticated with the secure server in the same manner to provide the recipient with each of the access codes. The method may further include transmitting the plurality of objects to the recipient from different issuers and authenticating the recipient with the secure server in the same manner to provide the recipient with each of the access codes.

When registering the access code with a secure server and authenticating the recipient with the secure server to provide the recipient with the access code, the authentication may be provided by requesting authenticating information resulting from an enrolment object. In this instance, the enrolment object provides the recipient with the authenticating information responsive to a successful response by the recipient to a query transmitted to the recipient by the issuer.

Accordingly the method may include transmitting an object to the recipient which comprises an enrolment object which enrols the recipient with a secure server and provides the recipient with authenticating information responsive to a successful response by the recipient to a query by the enrolment object, and providing the recipient with an access code associated with a subsequently transmitted object upon the secure server subsequently receiving the authentication information from the recipient.

The enrolment object is preferably disabled responsive to providing the recipient with authenticating information.

A successful response by the recipient to the query may be determined by comparing a response by the recipient to a solution stored both within the enrolment object and on the secure server.

The method may further include transmitting a plurality of enrolment objects to a plurality of recipients in which each of the recipients receives respective authenticating information from the secure server upon successfully responding to a query, and subsequently providing each of the recipients with an access code to a subsequently transmitted object upon receipt by the secure server of the respective authenticating information.

The plurality of recipients may commonly receive a subsequently transmitted common object having an access code associated therewith in which each of the recipients receives from the secure server the access code to the common object upon receipt of the respective authenticating information.

When the recipient comprises an organization having a plurality of users, the method may include selecting authorized ones of the users within the organization which are permitted to view the data when the data is encrypted into the object and permitting only the authorized ones of the users to view the data by providing each of the authorized ones of the users with a respective password including identification of a respective portion of the data to be viewed in association therewith.

According to a further aspect of the present invention there is provided a delivery system for secure delivery of electronic data from an issuer to a recipient in which the issuer and the recipient are linked by an electronic communication system for communicating electronic data there between, the system comprising:

a data packager for packaging selected data belonging to the issuer into an object for transmission to the recipient by the communication system;

the data packager including encryption means for encrypting the object so that an access code must be entered by the recipient prior to displaying the data; and a transaction archive for registering the object being transmitted and for recording attempts to enter the access code.

Various embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Referring to the accompanying figures there is illustrated a system and method for delivering electronic data from an issuer to a recipient in a secure and traceable manner using a secure, signed, traceable data object (SSTDO), also referred to herein as a jar. As described herein, the SSTDO is a self contained computer application and data component which has been protected with the latest available data encryption algorithms, signed with a Public Key encryption process and delivered by any current means of data transport wherein delivery is tracked prior to exposing the data to the end user (program or human).

Figure 1:
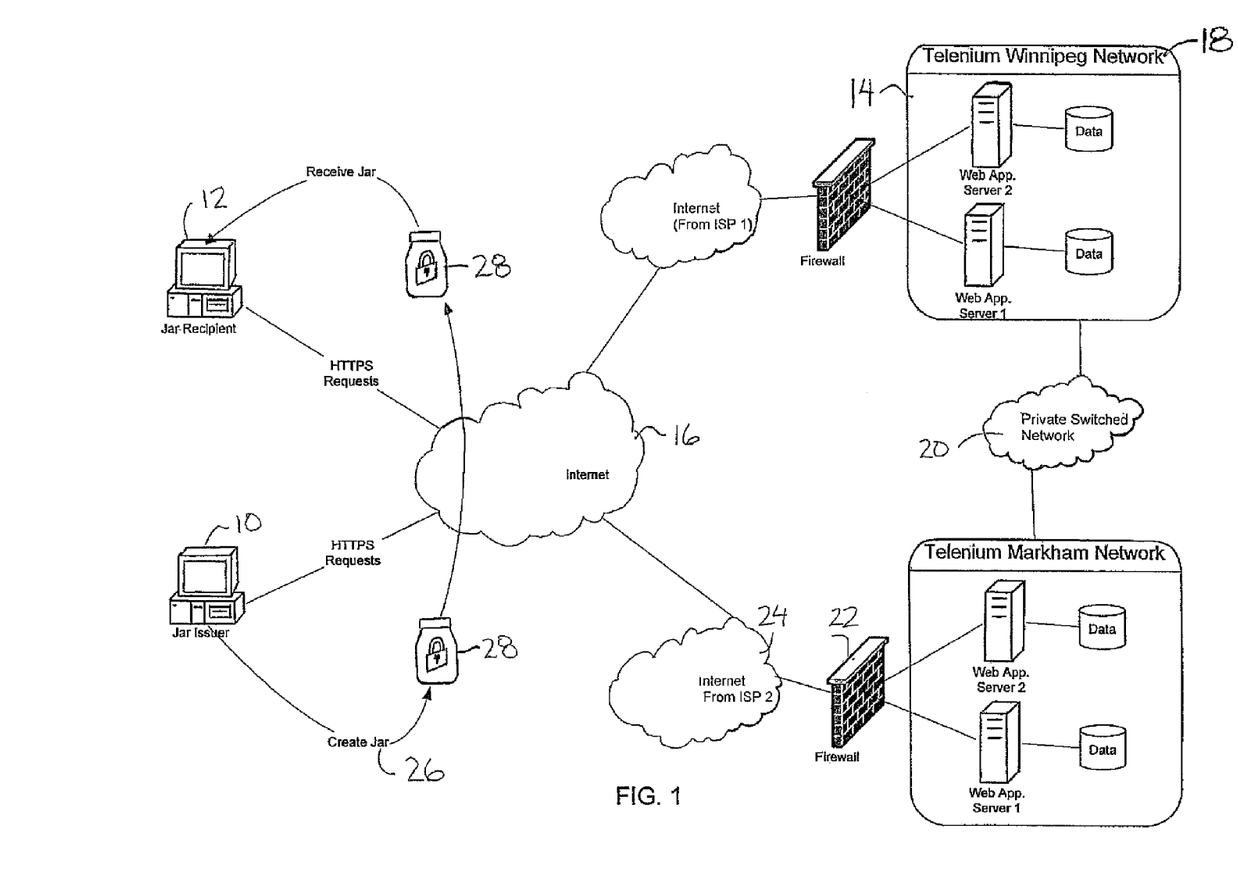
FIG. 1 is a schematic overview of the method and the system according to the present invention of secure delivery of electronic data from an issuer to a recipient.

Referring initially to FIG. 1, an overview of the method and system according to the present invention is illustrated. Data is shown securely transmitted from an issuer 10 to a recipient 12. A secure server 14 is provided for communicating with both the issuer 10 and the recipient 12 through the internet 16 in the illustrated example. The secure server may comprise two separate networks 18 connected by a private switched network 20 each with their own respective fire wall 22 with a respective internet connection 24 for communication with the internet 16. Both secure servers have the same data and requests from data objects will go to either server depending upon availability.

The issuer 10 initially creates a data object during a creation process 26 so that the resultant object 28, also known as a jar, can be transmitted to the recipient 12. During the creation process 26 the issuer communicates through the internet with the secure server to register the object with a transaction archive of the server which tracks that object as it is transmitted. The object is also encrypted during the object creation process 26. In order to access the data within the object 28 received by the recipient 12, the recipient is first prompted for an access code, for example a user name and password or other similar authorizing information. Prior to viewing the data, attempts to enter the access code by the recipient must first be registered with the transaction archive and determined to be correct at which point the object is decrypted for viewing by the recipient.

Figure 2:
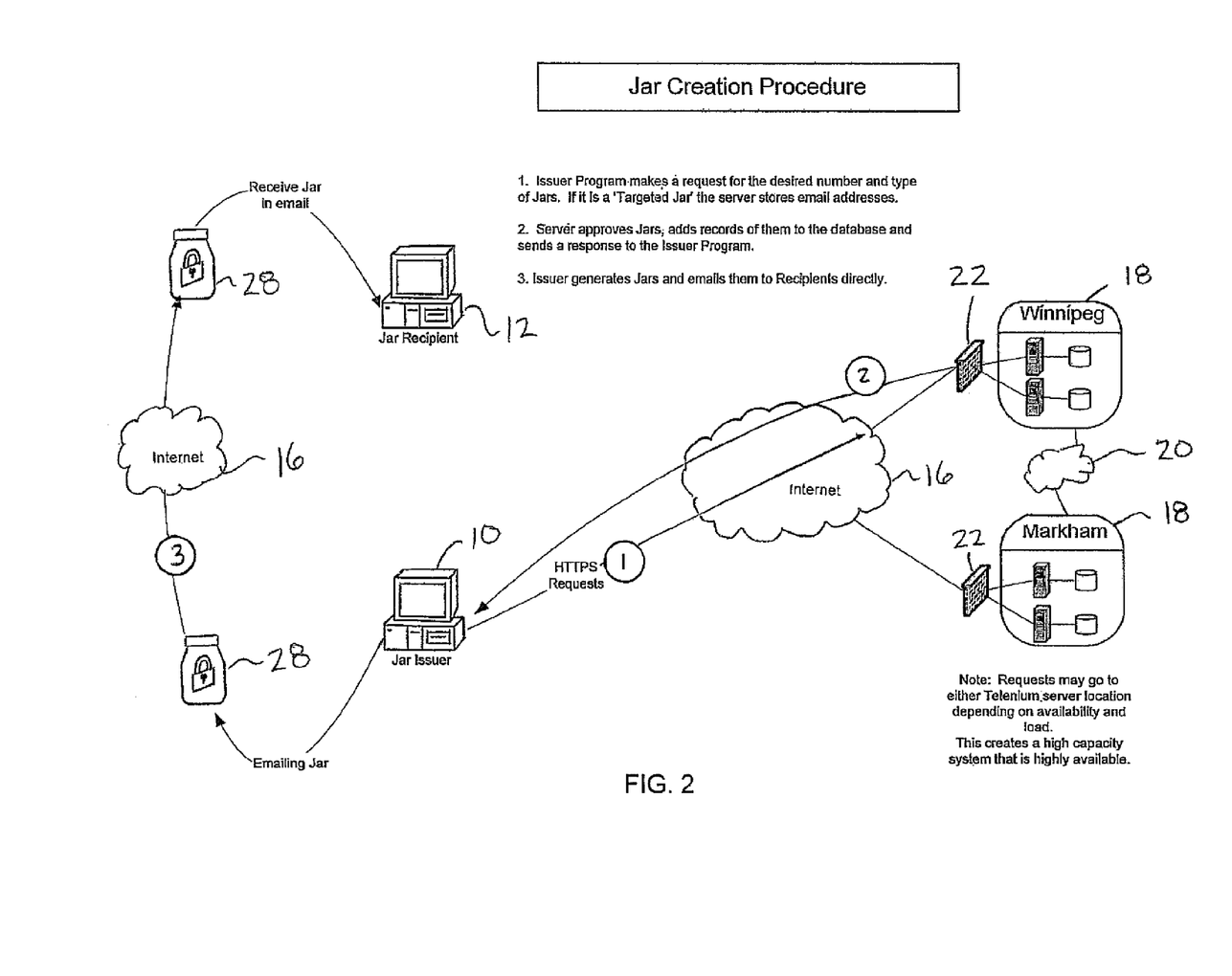
FIG. 2 is a simplified schematic illustration of the data object creation procedure.

As shown in FIG. 2, the creation process 26 for creating the data object involves the issuer program initially requesting for a desired number and type of objects to be created. If the object is a targeted type jar the secure server will store e-mail addresses associated with the objects. The server approves the creation of the object and registers them by adding a record of the objects to the secure server database and then sending a response to the issuers program as shown as step 2 in FIG. 2. The issue program thus proceeds with creating and transmitting the encrypted data object through the internet to the recipient as shown in step 3 of FIG. 2.

Figure 5:
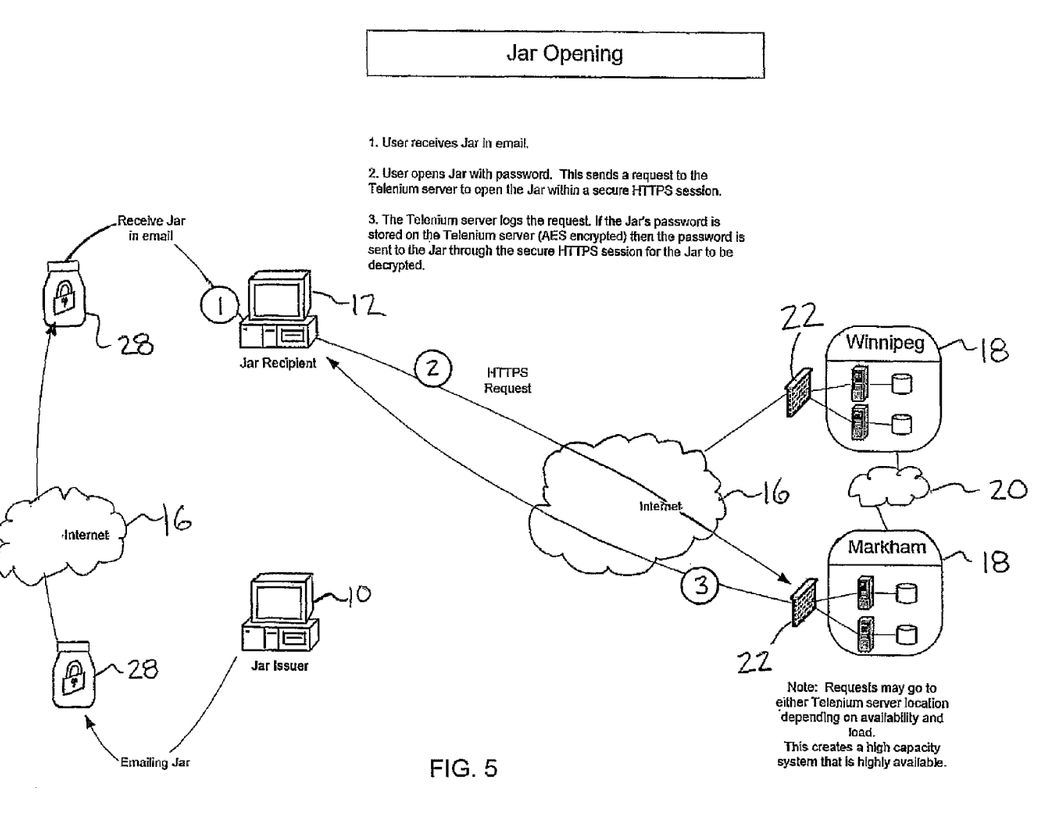
FIG. 5 is a simplified schematic view of the data object opening and decryption process.

Turning now to FIG. 5, the opening and decryption process of the data object is briefly illustrated. Once the object is initially received at step 1, the recipient opens the object using a password or access code. This sends a request to the secure server to open the object within a secure internet transaction as shown in step 2 of FIG. 5. The secure server then logs the request and if the password is stored on the secure server then the password is sent back to the data object through the secure internet transaction for the jar to be decrypted responsive to submission of suitable authorizing information by the recipient.

The invention in its current implementation has been implemented using Java programming language, since it provides for a number of the essential elements of the SSTDO. Java is widely supported on a cross computer platform and operating system environments. Java also allows for an object oriented approach to the delivery of the data which allows for both human access to the data as well as computer program access to the data. The components can be delivered through the common web browser, and can make use of the general internet for the tracing aspects of the system. The SSTDO as implemented in Java exists as an sstdo.jar file. This file can be downloaded via an internet browser or emailed as an attachment, or ftp transferred to any computer that supports the internet. Once delivered to the computer the sstdo.jar file can be executed in a Java run time environment such as a web browser or an email client such as Microsoft Internet Explorer or Microsoft Outlook.

In addition to the SSTDO the system consists of a number of external processes. These are a Certification Authority (http://ospkibook.sourceforge.net/docs/OSPKI-2.4.7/OS-PKI-html/ca.htm), a Transaction Archive and a Data Packager. The Certification Authority is responsible for Authenticating the Public Key signatures which are used to validate the signer of the object as well as the recipient of the object and to Authenticate the secure web services of the Transaction Archive. The Data Packager can be a separate process or in other implementations (where the size of data transmission is not a constraint) the Data Packager process could also be a component of the SSTDO. The role of the Data Packager process is to allow the user of the system to select Data to be protected, place it in a SSTDO, select who is authorized to view the data (although this may be implied based on the object type) and sign the object with the senders PKI signature.

The Transaction Archive allows for the tracing of SSTDO access and history. Each time the SSTDO is executed a transaction record is registered with the Transaction Archive. For the current implementation of the invention, the Transaction Archive is implemented as a Secure Web Service (https) The Transaction Archive will store the IP address, SSTDO identification, the certificate of the issuer and identification of the accessing individual or system, along with the date and time of access, and the resulting success or failure of the access. The Transaction Archive also allows for users of the SSTDO system to access these histories via Secure Web Services (https) and a password authenticated session. Once authenticated, the user can view a history of accesses for SSTDO objects that have been issued by the user, as well the user can revoke access to SSTDO objects which have already been distributed, thus further revoking the recipient's access to the information.

The Data Packager process performs a number of operations in the system. These include: 1) the selection of data to be placed in the sstdo.jar file; 2) the selection of the encryption method (eg 3DES, RSA SHA, AES, etc http://www.infosyssec.org/infosyssec/crvptalgorithms.html) and the encryption of the data to be stored in the sstdo.jar file; 3) the registration of the list of authorized access codes; 4) the compression and signing of the sstdo.jar file by the issuer; and 5) the registration of the sstdo.jar file with the Transaction Archive.

Figure 8:
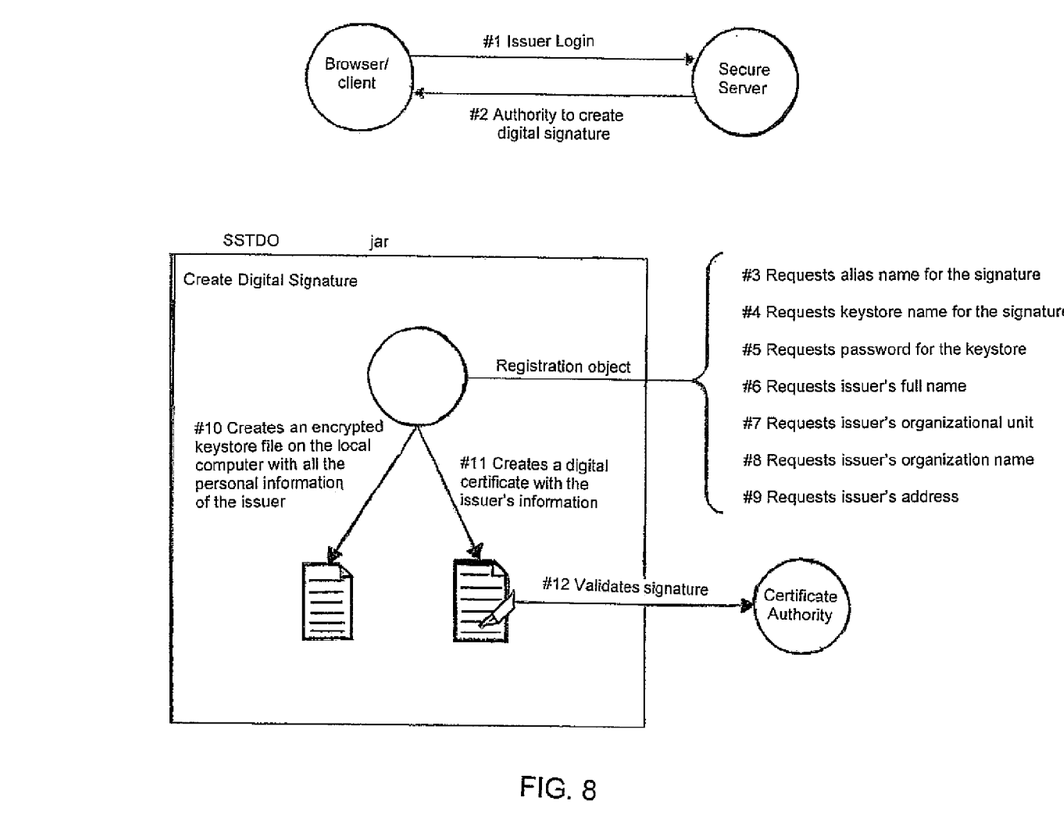
FIG. 8 is a schematic view of a digital signature registration process for use with the system and method of the present invention.

Referring to FIG. 8, the digital signature registration process will now be described in further detail. Before making use of the data packager to create objects according to the present invention, each user of the system must first be registered. Registration begins with the user logging into a secure server to provide authority to the browser or client to create a digital signature. Once authority has been given, creation of the digital signature requires the issuer's full name, organisational unit, organisation name and address along with an alias name for the signature and a keystore name for the signature. A password for the keystore is also requested. An encrypted keystore file is then created on the local computer with all of the personal information of the issuer thus enabling a digital certificate to be created with all of the issuer's information. A signature of the digital certificate is validated with the certificate authority to complete the digital signature registration process.

Figure 3:
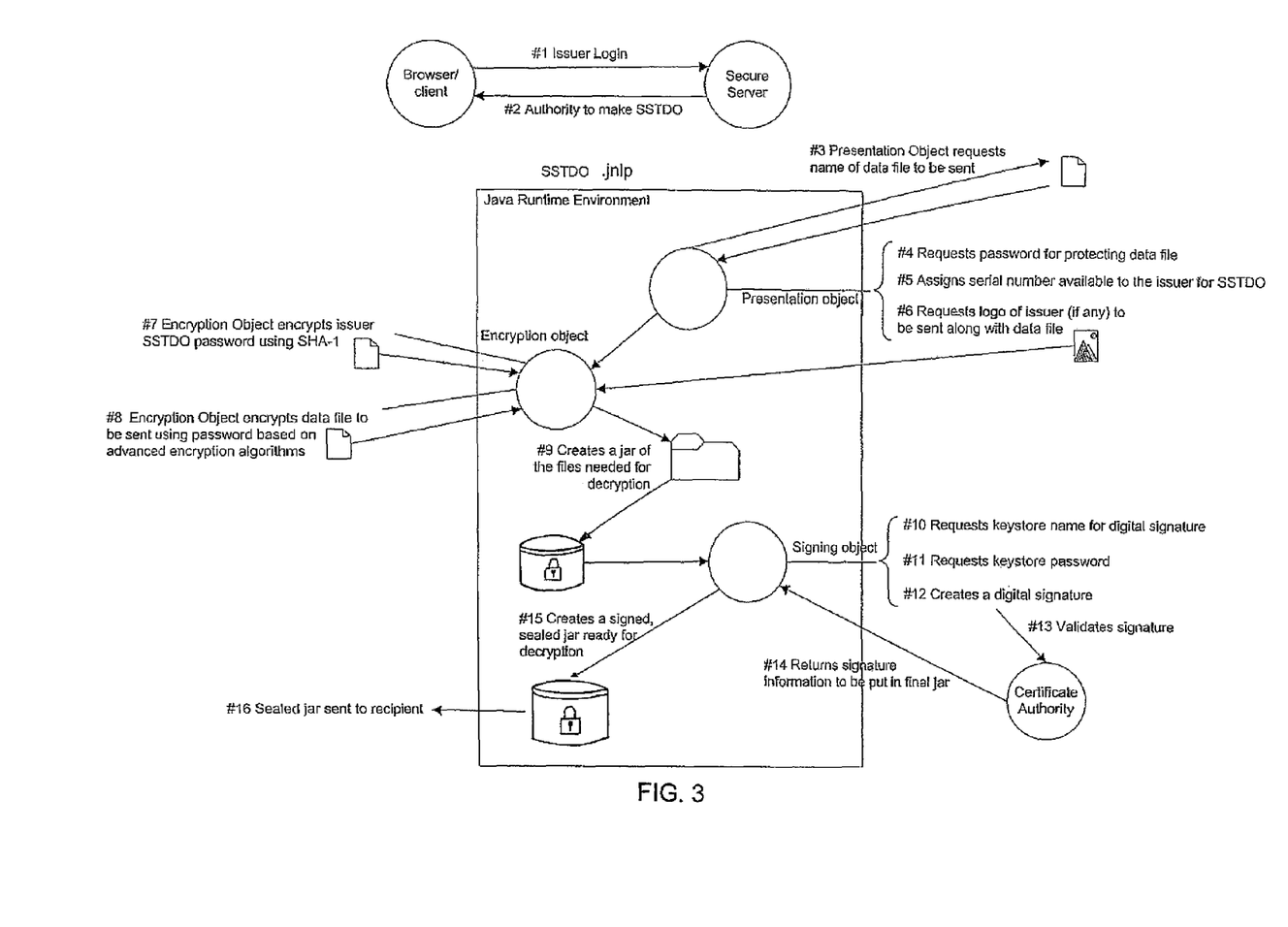
FIG. 3 and FIG. 4 are more detailed schematic illustrations of the object creation and encryption process with some minor variations in the process appearing in the two figures.
Figure 4:
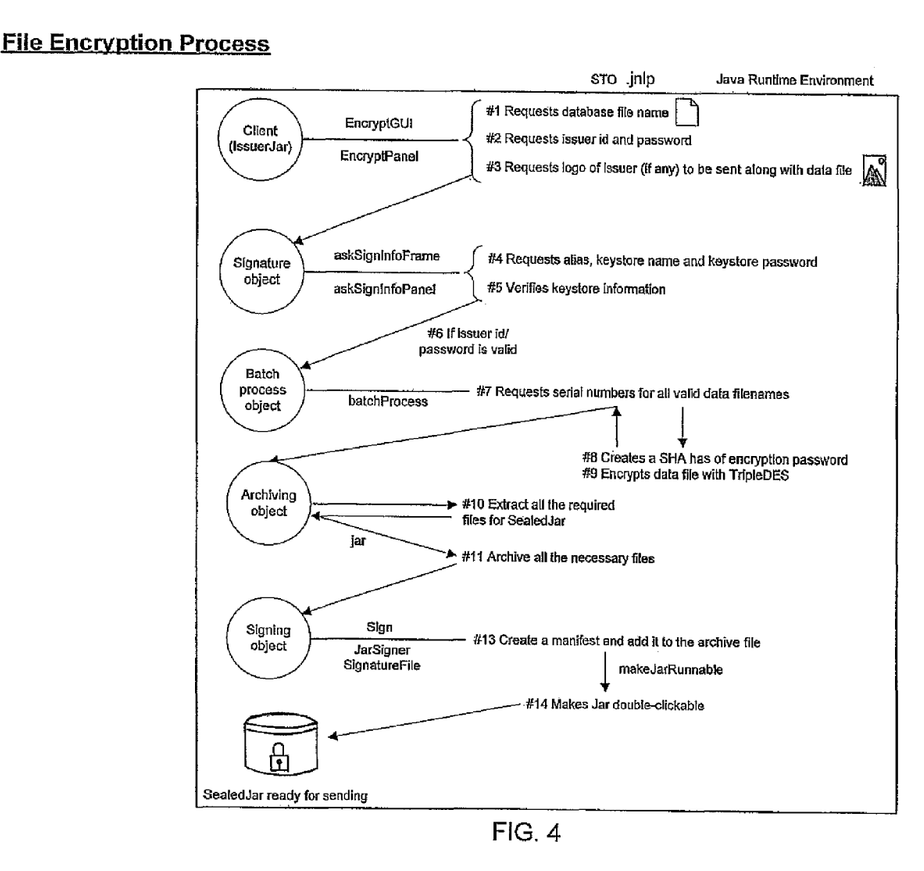

Registered users can then make use of the system to produce an SSTDO according to the file encryption process of FIG. 2, 3 or 4. The issuer of information to be transmitted to a recipient must first login to a secure server to obtain authority to make the secure object. The first step in forming the object to be transmitted involves prompting the issuer for the names of data files to be incorporated into the object. This is accomplished by a presentation object which requests the password for protecting the data file, assigns a serial number or identification available to the issuer for the SSTDO and requests a logo of the issuer if available to be sent along with the data files. The presentation object is then encrypted using a password and advanced encryption algorithms to create a .jar file of the files needed for decryption. The object must then be signed before being transmitted by requesting the keystore name for digital signature and the associated password before creation of digital signature which is then validated with the certificate authority and returned for assimilation into the final jar file. The signed and sealed jar ready for decryption is then sent to the recipient.

The file encryption process as illustrated in FIG. 4 is similar to that illustrated in FIG. 3 with the exception of the option of a batch process object and by an archiving object. The batch process object permits numerous batch files to be created and encrypted into objects in a single step by the issuer. The batch process object involves the step of requesting serial numbers for all valid data file names from the issuer and creates an encryption password associated with each object to be delivered in which the objects are encrypted with triple-DES. The archiving object extracts all of the required files for the data object to be transmitted and archives all of the necessary files with the transaction archive prior to signing the object with the digital signature of the issuer. An additional function is also provided to create a manifest and add it to the archive file as well as a further function of converting the data object so that it immediately opens and performs its required functions when double clicking on its associated desktop icon to open it. The archiving object is particularly useful for a targeted encryption mode as described further below with regard to FIGS. 9 and 10.

Figure 6:
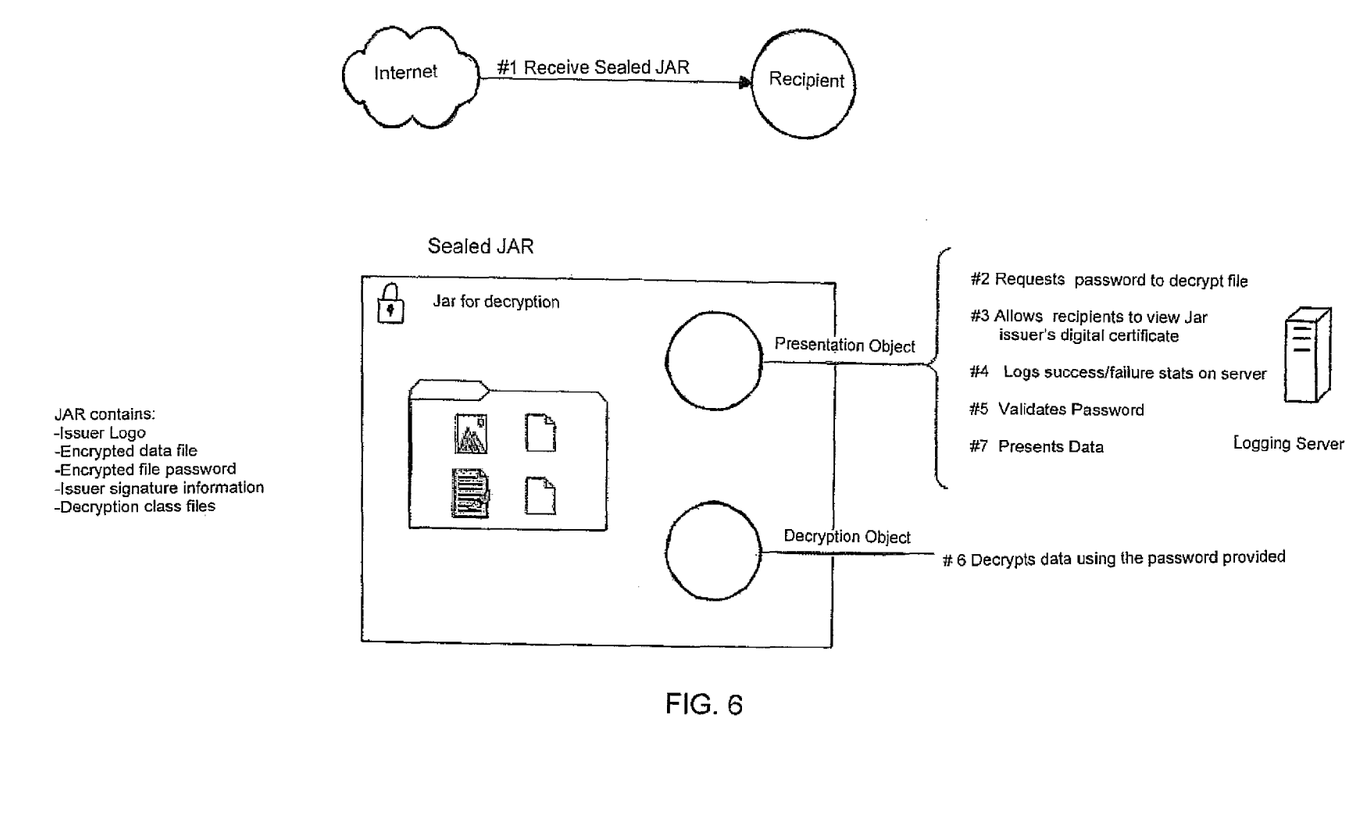
FIG. 6 and FIG. 7 are schematic illustrations of the decryption process in various degrees of detail.
Figure 7:
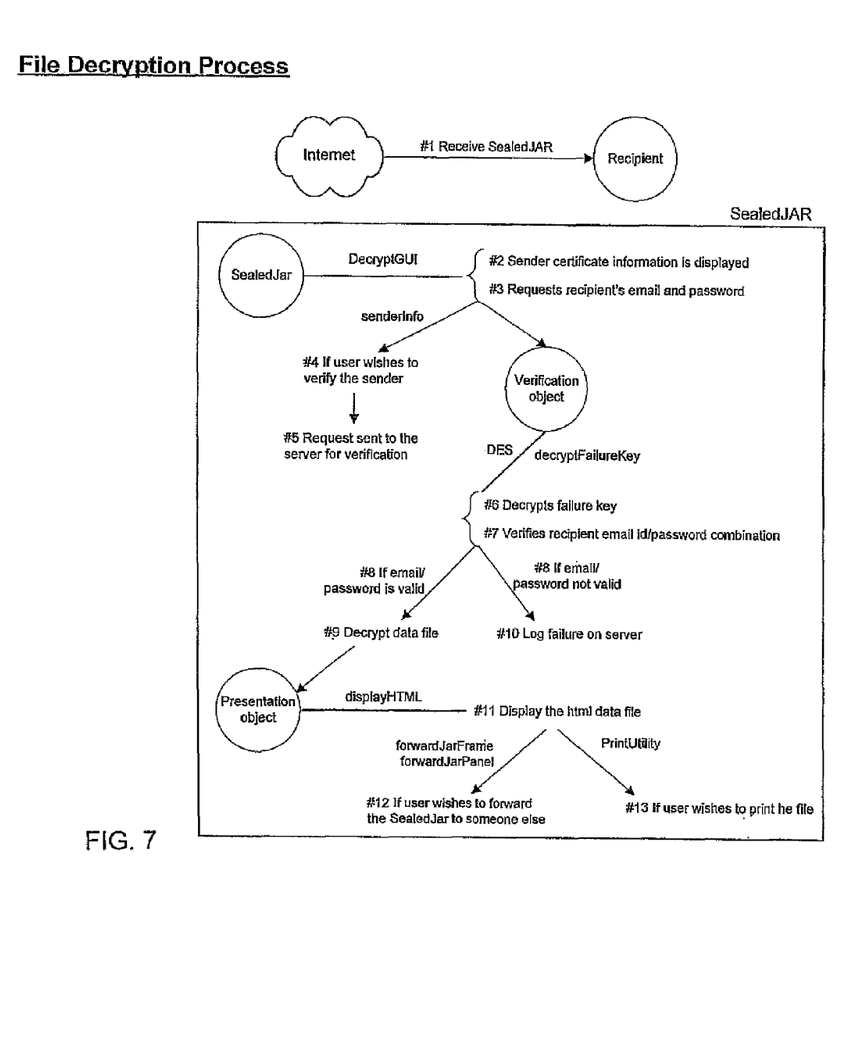

Upon receipt of the encrypted object, the recipient must follow the file decryption process illustrated in FIGS. 5, 6 and 7 in order to view the information. The sealed jar is received by any number of conventional electronic means, such as the internet for example. When the recipient attempts to access the data encrypted within the object received, the presentation object requests the password required to decrypt the file while allowing the recipients to view the issuer's digital certificate. All attempts to open the object are recorded on the logging server of the transaction archive regardless of whether a successful or failed attempt at viewing the information resulted. Once the password is validated the decryption object decrypts the data using the password provided prior to presentation of the data to the recipient.

As shown in greater detail in FIG. 7, once the object is received by the recipient, and before decryption, the digital certificate of the issuer in an unencrypted form is first displayed to the recipient prior to requesting the recipient's e-mail and password or any other suitable authorizing information. The recipient may choose to verify the sender by sending a request to the server for verification. A verification object of the system verifies the recipient's authorizing information and will either log a failure on the transaction archive of the server if the information is incorrect or begin to decrypt the data within the object if the authorizing information is correct.

Under a targeted mode of encryption described further below, if the authorizing information is correct, the secure server provides the recipients program with the suitable access code required for the decryption process. In other modes of encryption, the authorizing information inputted by the recipient in the form of an access code is sufficient for decrypting the data file. Decryption involves a presentation object which displays the data in an html form to the recipient. The recipient is then provided with the options of forwarding the data object to a different recipient or printing the data file.

Keeping the client's need as well as the latest encryption standards in mind, various types of objects for transmitting data (also known as SealedJars) have been created. All types of SealedJars consist of two main modules: encryption and decryption. Throughout this document, the term "issuer" signifies the person creating the SealedJar while the term "recipient" or "client" signifies the person who would be opening the SealedJar. The process of encryption and decryption for each SealedJar type is described below:

1. Pure TripleDES SealedJar

As the name signifies, the algorithm used is TripleDES Password Based Encryption (PBE). This algorithm uses symmetric key i.e. the same key is used for encryption as well as decryption. Hence, prior to sending the SealedJar, the issuer must send the key to the client either through phone or mailed along with last invoice or some other means.

The issuer then encrypts the data with the key (password), signs the SealedJar with his certificate information, and then sends the SealedJar to the client. A batch compliant version of SealedJar is also available which allows the issuer to create Sealediars for all its clients in one step through a batch file.

The client is prompted for a password when he/she opens the SealedJar. This is the same password used to encrypt the data inside the SealedJar. The issuer's certificate information is also displayed so that the client can be sure that the SealedJar was indeed sent from the issuer. For further validation, the client may also view the issuer's public certificate. Each SealedJar carries a footprint (SHA-1 hash) of the correct password. Another footprint is generated of the password entered by the client. If these two footprints match then a successful open event for that particular SealedJar is logged onto the secure server and the data is decrypted. If the footprints fail to match then a failure event for that SealedJar is logged on the server and the client is asked to enter the password again. The client is given only a certain number of tries failing after which the SealedJar locks itself. Even if some malicious user gets hold of the SHA-1 hash footprint inside the jar, the security of the data is still maintained since it has been proved that the password cannot be reverse engineered from the SHA-1 hash in an appreciable amount of time. Before decrypting and displaying the data, the SealedJar sends the server its serial number and its version number. The server then checks the validity and authenticity of the SealedJar. The data is decrypted only when the SealedJar gets a successful confirmation back from the server.

The advantages of using this method is that symmetric key encryption is a lot faster and incorporates a lot less processor overhead as compared to asymmetric key encryption.

The SealedJar contains the data file in encrypted form as well as a SHA-1 hash of the password. The rest of the files including issuer logo, Java class files and web browser plugins (if needed) are stored unencrypted in the SealedJar.

Note: SHA-1 hash is 160 bits long while the user password is dynamically converted into an encryption key using a 128 bit MD5 message digest.

2. Pure RSA SealedJar

The algorithm used in this SealedJar is RSA which uses asymmetric key encryption/decryption. Since different keys are used for encryption and for decryption, the issuer does not need to worry about sending a key to the client. In most cases the issuer does not even know the client's key. However, the client needs to be registered with the issuer in order to receive the SealedJar.

The issuer encrypts the data with their public key, signs the SealedJar with their certificate information, and sends the SealedJar to the client. A batch compliant version of SealedJar is also available which allows the issuer to create SealedJars for all its clients in one step through a batch file.

The issuer's certificate information is displayed on the SealedJar so that the client can be sure that the SealedJar was indeed sent from the issuer. For further validation, the client may also view the issuer's public certificate. During the initial registration procedure, the client's private key is encrypted and stored in a password protected file (keystore). The client needs to specify the location of this keystore and its password in order to decrypt the data inside the SealedJar. If the client specifies the wrong keystone/password combination, an opening failure event for this SealedJar is logged on the secure server. If the keystore and the password are correct then a success event is logged on the server. Before decrypting the data using the client's private key and displaying it, the SealedJar sends the server its serial number and its version number. The server then checks the validity and authenticity of the SealedJar. The data is decrypted only when the SealedJar gets a successful confirmation back from the server.

This method is very secure as there are no password footprints inside the SealedJar. Each client has their own unique private key with a corresponding public key stored on the issuer's server. Hence, no one other than the client can decrypt the data, not even the issuer. RSA algorithm is based on a lot of complex calculations and hence the encryption and decryption processes are time-consuming and computer processor intensive.

This SealedJar contains only the original data file in encrypted form. The rest of the files including issuer logo, Java class files, other images and web browser plugins (if needed) are stored unencrypted in the SealedJar.

Note: Public and Private keys are by default 1024 bit long.

3. Targeted SealedJar

This SealedJar was designed for issuers who do not want to manage passwords for their clients. The secure server maintains a list of AES encrypted random passwords which can be used for encryption and decryption. The process is very similar to the pure TripleDES SealedJar except that the client has to be registered, by enrolment with the secure server as described below, to receive the SealedJar.

To encrypt the data, the issuer's software requests for a password from the server using a secure http request. The issuer then encrypts the data with the server supplied password, signs the SealedJar with their certificate information, and sends the SealedJar to the client. A batch compliant version of SealedJar is also available which allows the issuer to create SealedJars for all its clients in one step through a batch file.

The client can validate the authenticity of the SealedJar by viewing the issuer's certificate information displayed on the SealedJar or optionally viewing the issuer's public certificate. The client is prompted for their username (email address) and password to open the SealedJar. This username and password (or other suitable authenticating information) is given to the client at the time of registration or enrolment process described further below. The username and password entered by the client is sent to the server through a secure http request. The username and the password are matched on the server. If they are correct then a success event is logged on the secure server and the decryption password or code, which allows access to the object, is sent back to the SealedJar through the same secure http request. A footprint of the decryption password is generated and matched with the footprint of the password used for encryption. If the footprints match then the data is decrypted using this decryption password and a successful SealedJar open event is logged on the secure server. But before decrypting and displaying the data, the SealedJar sends the server its serial number and its version number. The server then checks the validity and authenticity of the SealedJar. The data is decrypted only when the SealedJar gets a successful confirmation back from the server. If the footprints fail to match or if the username/password combination is incorrect, then a failure event is logged on the secure server and the client is asked to enter the username and password again. The client is given only a certain number of tries failing after which the SealedJar locks itself.

The advantage of using this system is that the issuer does not need to worry about sending passwords to the client for each SealedJar or about maintaining the pool of available passwords for encryption/decryption.

This SealedJar contains the data file in encrypted form as well as a SHA-I hash of the password. The rest of the files including issuer logo, Java class files and web browser plugins (if needed) are stored unencrypted in the SealedJar.

Figure 9:
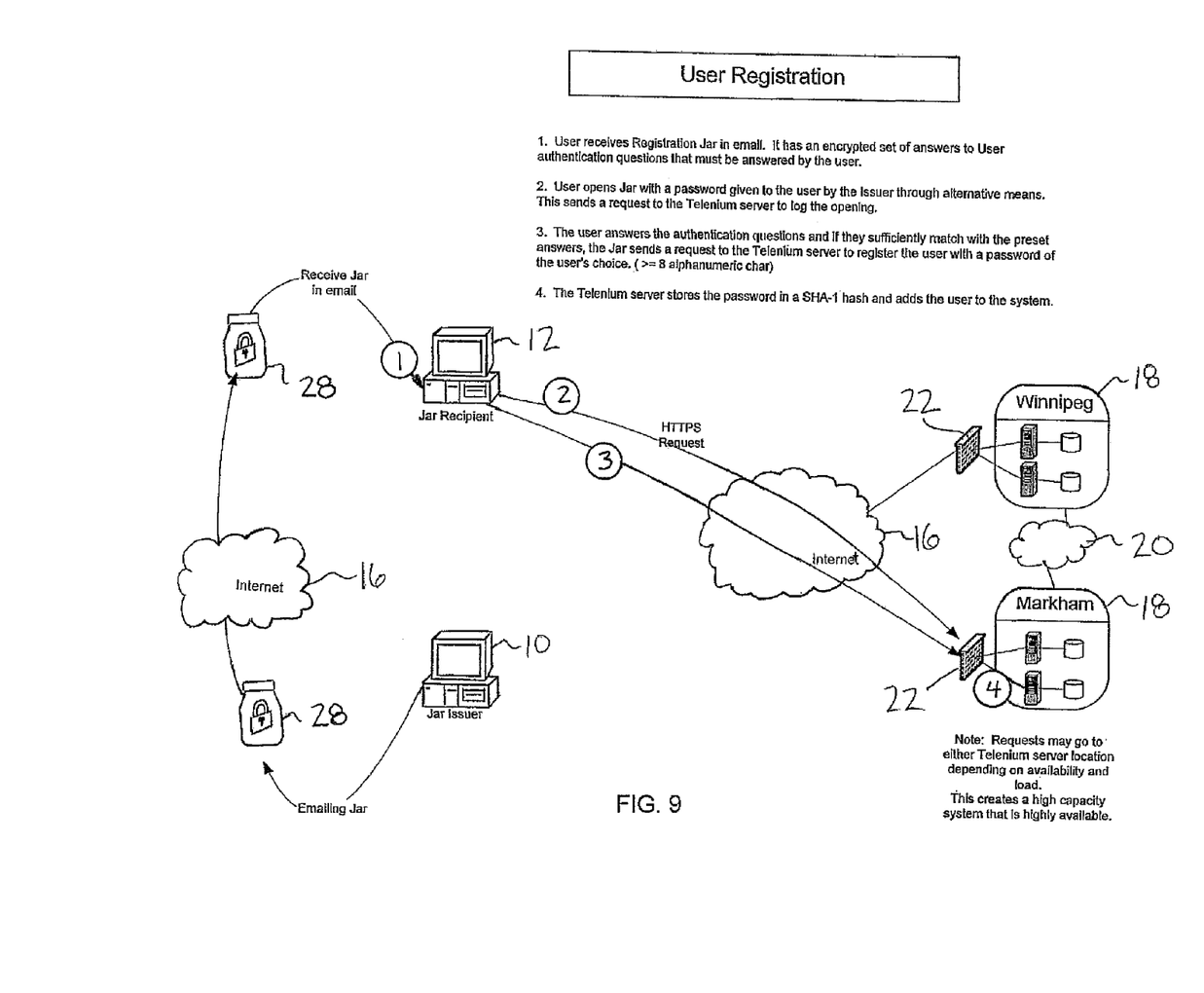
FIG. 9 is a schematic illustration of a user enrolment or registration process using an enrolment object transmitted to the recipient.

In order to register a prospective client or recipient with the secure server, the recipient must first be enrolled. This is accomplished by an object transmitted from the issuer to the client which is known as an EnrolmentJar for Recipients using TripleDES. The enrolment process of the EnrolmentJar is illustrated in FIG. 9.

The EnrolmentJar was designed to register users to be able to receive and open SealedJars. Each EnrolmentJar is associated with a specific email address and cannot be used to enrol a person with another email address. The encryption algorithm used is TripleDES Password Based Encryption (PBE). This algorithm uses symmetric key i.e. the same key is used for encryption as well as decryption. Hence, prior to sending the SealedJar, the issuer must send the key to the client either through phone or mailed along with last invoice or some other means.

The issuer (person vouching for the new client) decides on a certain number of questions (presently, we allow a maximum of 10 questions) which would have to be answered correctly by the prospected client to validate the client's identity. The issuer has the option of specifying the question type for each question so that input fields can be formatted accordingly e.g. if the issuer species the question type as a phone number then the input field presented to the client would accept only digits in the following format: (###) ###-####. Various formatting options are available based on current industry standards. The issuer also decides the answers to which questions need to be matched exactly with the pre-set answers e.g. the issuer decides whether the client's answer to the postal code question needs to be matched exactly by our server with the answer on issuer's records (i.e. pre-set answer). If the issuer decides not to do an exact match then the question can be used just for information gathering purposes. The issuer encrypts these questions along with their correct pre-set answers with a self-selected key (password). The issuer then signs the EnrolmentJar with his certificate information and sends the EnrolmentJar to the client. A batch compliant version of EnrolmentJar is also available which allows the issuer to create EnrolmentJars for all its specified clients in one step through a batch file.

The prospective client is prompted for a password when they opens the EnrolmentJar. This is the same password used to encrypt the data inside the EnrolmentJar. The client may view the issuer's public certificate to validate that the EnrolmentJar was indeed sent from the issuer. Each EnrolmentJar carries a footprint (SHA-1 hash) of the correct password. Another footprint is generated of the password entered by the client. If these two footprints match then a successful open event for that particular EnrolmentJar is logged on the secure server. Before decrypting the data, the EnrolmentJar sends its serial number and version number to the server. The server then checks the validity and authenticity of the EnrolmentJar. The data is decrypted only when the EnrolmentJar gets a successful confirmation back from the server. If the footprints fail to match then a failure event for that EnrolmentJar is logged on the server and the client is asked to enter the password again. The client is given only a certain number of tries failing after which the EnrolmentJar locks itself. Even if some user with malicious intent gets hold of the SHA-1 hash footprint inside the jar, the security of the data is still maintained since it has been proven that the password cannot be reverse engineered from the SHA-1 hash in appreciable amount of time. Once the client successfully enters the correct password and the server confirms the validity of the EnrolmentJar, the client is presented with those questions set by the issuer. The answers entered by the client are matched with the answers pre-set by the issuer in the EnrolmentJar itself as well as sent to our server for a two level validation. The client is also asked to select an alpha-numeric password which would be used by the client to open SealedJars sent by the issuer in future. If the answers entered are correct then the client's selected password is recorded on our server and associated with his username (currently email addresses are used as usernames). Once an EnrolmentJar has been used to successfully register a client, the EnrolmentJar gets disabled i.e. the same EnrolmentJar cannot be used to register twice.

The EnrolmentJar contains the issuer specified pre-set answers in encrypted form as well as a SHA-1 hash of the password. The rest of the files including the questions to be asked, issuer logo, and Java class files are stored unencrypted in the EnrollmentJar.

As described herein, the object being transmitted according to the present invention may comprise 1) an encrypted data object, comprising information intended for secure transmission from an issuer to a recipient, or 2) an enrolment object comprising an object which registers an intended recipient with a third party secure server to permit decryption of a subsequently transmitted encrypted data object from an issuer with the involvement of the third party secure server. The enrolment object is also transmitted from the issuer to the recipient as a data object and is also preferably encrypted. The enrolment object differs primarily from other encrypted data objects in that its primary function is to register the recipient with the third party secure server, not just securely and traceably deliver information to the recipient.

To effect its enrolment or registration function, the enrolment object enrols the recipient with the secure server and provides the recipient with authenticating information in response to a successful response by the recipient to a query by the enrolment object involving a number of security questions. If the recipient is able to answer the security questions successfully, the recipient is provided with suitable authenticating information in the form of a user name and password that can be used for subsequently logging into the secure server to obtain access codes to future transmitted encrypted objects.

When using a third party secure server, decryption of subsequently transmitted encrypted data objects requires the recipient obtaining an access code from the secure server. After completion of the enrolment of the recipient with the third party secure server by the enrolment object, whenever the recipient receives one of the subsequently transmitted encrypted data objects containing information to be securely delivered to the recipient, the recipient is queried by the secure server for the authenticating information resulting from enrolment. The secure server then provides the recipient with the access code required for decrypting the encrypted data object upon successfully logging in to the secure server with the appropriate authenticating information.

The enrolment object, used to enrol a recipient and provide them with authenticating information to subsequently log onto the secure server, is arranged to be automatically disabled upon successfully enrolling a recipient to prevent further recipients from being enrolled using the same enrolment object.

The solution to the security questions of the enrolment object which determine whether the recipient should receive authorizing information for future logins is stored both within the enrolment object and on the secure server for added security in confirming a successful response to the security questions.

Figure 10:
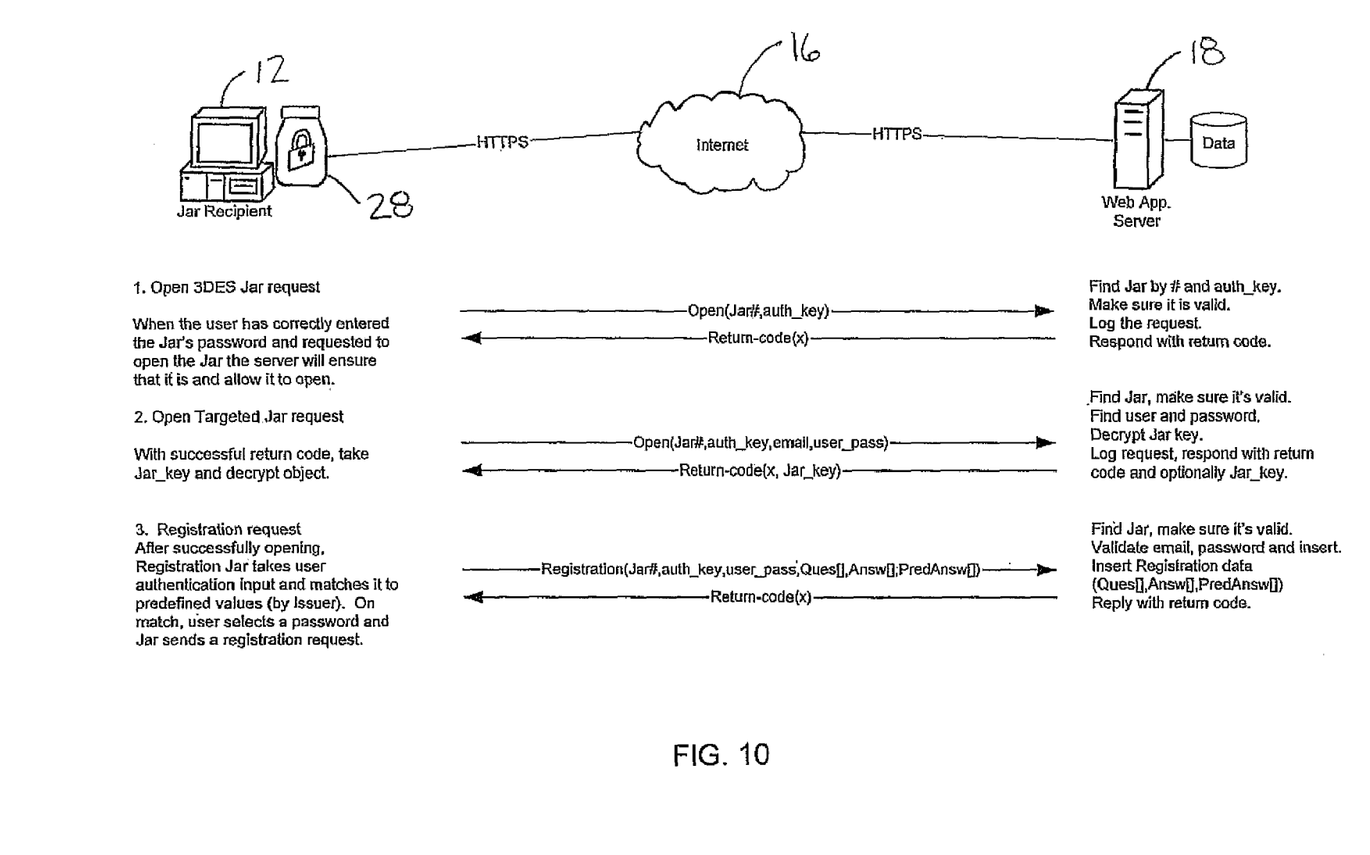
FIG. 10 illustrates a comparison between the different communications between the recipient of the object and the secure server locating the transaction archive thereon for three different modes comprising 3DES encryption or targeted encryption or the enrolment process.

Turning now to FIG. 10, three examples of the mode of communication between the recipient and the secure server are shown. A first mode of communication therebetween involves a 3DES type of encryption in which a recipient directly provides the access code to the decrypted object which confirms entry of the access code to the secure server. The server locates the encrypted object by serial number and authorization key to make sure that the object is valid and to log the request to open the data with the transaction archive prior to responding with the appropriate code which then allows the recipient to open the data in the encrypted object.

Under a second mode of communication using a targeted encryption mode, an attempt to open the data object involves the recipient communicating with the secure server to initially determine if the object is valid and then subsequently obtain the required authorizing information from the recipient in the form of a user name and password prior to locating a decryption key for the object. The request to open the object is logged by the transaction archive which then allows the decryption key or access code required to be returned to the user which uses the key to decrypt the object for viewing.

Under a third mode of operation the recipient communicates with the secure server upon receipt of an enrolment object. Upon initially attempting to open the enrolment object, the user is presented with security questions. The object receives the responding authentication imputed by the recipient for comparison to a solution provided by the issuer which is located both within the encrypted portion of the object and on the secure server. The solution entered by the recipient is thus forwarded to the secure server, which in addition to validation by object, also validates whether a proper e-mail address and password are provided to ensure that the proper recipient is registering with the secure server. Registration data is returned to the issuer who selects a password to complete the registration process of authenticating information to be used for subsequent transactions.

In one embodiment, a single issuer can transmit multiple objects to a plurality of different recipients using a batch process. This plurality of objects may comprise enrolment objects so that each recipient is individually queried with respective security questions once a suitable respective password is entered. Upon successfully responding to the security questions, the recipients are each permitted to register with the secure server and each receives respective authenticating information from the secure server in the form of a user name and password for logging in. Subsequently each of these recipients can then receive further encrypted objects in which the access code to decrypt the object is obtained by logging onto the secure server with the authenticating information to receive the access code associated with the subsequently transmitted encrypted object. This configuration is particularly useful when a single organization communicates with many clients but wishes the clients to manage their own respective user names and passwords. In some instances a common object with a single access code associated therewith can be transmitted to multiple recipients in which each of the recipients receive the access for decrypting the common object by inputting their own respective authenticating information to the secure server.

In further embodiments, when the recipient comprises an organization having many separate users, part of the data packaging by the issuer can involve selecting which users within the organization are permitted to view the encrypted data. The issuer may also specify what portions of the data are permitted to be viewed by each of the authorized users. Each of the users in this instance is provided with their own respective password required to be input for viewing the respective portion of the data with which they are authorized to view in association with their respective password.

In a simplified implementation of the system according to the present invention, the issuer may only require confirmation of delivery of data. In this instance the issuer encrypts the information into a self contained object which is then transmitted to the recipient by conventional means. In order to view the file contents of the object, the recipient must first attempt to access the object at which point the object automatically records the access with the transaction archive, providing confirmation to the issuer that the data was received prior to the recipient being able to view the information.

In another implementation of the system, an issuer may wish to send information to only one person in a secure manner in which only the intended receipt can read the contents of the object. In this instance the issuer encrypts the data incorporated into the object using a secure access code which only the recipient can then use to decrypt the information. Both the issuer and the recipient may have a digital certificate registered with the certificate authority to provide confirmation to each party of the origin and destination of the data file as recorded by the transaction archive during the encryption and decryption processes.

An example of a data collection implementation of the system would work as described below. This implementation of the system is desirable when an issuer wishes one or more recipients of the object to encrypt recipient data to be returned to the issuer in a secure manner enabling only the original issuer to view the data.

In this instance Company A is the initial issuer and wishes to receive data from Company B, the initial recipient. To do this Company A registers a Public Encryption Key which can be delivered to the sender of the information in a SSTDO or other means (since it is a public key).

Company B receives the SSTDO, validates Company A's signature against the Certification Authority and opens the SSTDO using a common web browser (or other suitable Java Run Time Environment). Using the Data Packager, Company B selects the Data to be placed into the SSTDO and uses the Data Packager process to encrypt the data using Company A's public encryption key. The Object is then signed by the Data Packager process using Company B's PKI signature. At this point the operator may also choose to provide a list of authorized users of the data. Company B then effectively becomes a secondary issuer and transmits the SSTDO to Company A using the internet or other means in which Company A, the initial issuer, then acts as a recipient.

Company A receives the SSTDO, the Signature of the Sender is validated by the Certificate Authority, and the data object is opened using a common web browser (or other suitable Java Run Time Environment). Prior to presenting the data to the user (or program), the SSTDO registers an access to the data with the Transaction Archive. The SSTDO also validates the user of the data against the authorization list (if provided) and then, as appropriate, grants access to the Data. Unauthorized accesses to the Data will also be logged with the Transaction Archive.

For the purposes of this implementation communications with the Transaction Archive, will be via SSL based transfers. Failure to communicate with the Transaction Archive would result in denial of access to the data. Tracing of SSTDO's is accomplished through Authenticated web browser session with the Transaction Archive by the Signer of the SSTDO.

One aspect of novelty of this invention is the use of a self contained data object to implement a Public Key Encryption system thus allowing for universality of delivery and access. The invention is also novel in that it provides for the integrated tracking/tracing of access to this information, prior to the extraction of the Data.

There are numerous other values associated with the present invention. Since the object is self-contained it can be passed from user to user for the purpose of obtaining additional signatures. Thusly the equivalent of an electronic cheque with multiple signatures can be accomplished using SSTDO's with the added benefit of tracing.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method for secure delivery of electronic data from an issuer to a recipient, the method comprising:
    selecting data belonging to the issuer to be delivered;
    encrypting the data;
    packaging the encrypted data into an object comprising a self contained computer application such that the object includes the encrypted data packaged therein;
    registering the object with a transaction archive on a remote secure server so as to be arranged for tracking the object;
    transmitting the object including the encrypted data packaged therein to the recipient;
    registering receipt by the recipient of the object including the encrypted data packaged therein with the transaction archive;
    using the transaction archive to generate an access code in response to registration of the receipt of the object including the encrypted data packaged therein by the recipient;
    transmitting the access code from the transaction archive to the object received by the recipient such that the self contained computer application of the object is arranged to decrypt the encrypted data packaged therein upon receipt of the access code from the transaction archive; and
    displaying the data previously delivered to the recipient in encrypted form packaged with the object only upon decryption of the encrypted data by the self contained computer application of the object using the access code from the transaction archive.

2. The method according to claim 1 including verifying the issuer to the recipient using a certificate authority.

3. The method according to claim 1 including attaching a non-encrypted digital certificate to the data encrypted into the object.

4. The method according to claim 1 including restricting access to the transaction archive to only the issuer.

5. The method according to claim 1 including selecting a data packager to be encrypted into the object which permits the recipient to encrypt information into an object to be returned back to the issuer.

6. The method according to claim 1 including encrypting the data into the object using a private and public key pair.

7. The method according to claim 1 including prompting the user for authenticating information and generating the access code for transmission from the transaction archive to the object only upon successful receipt of the authenticating information by the transaction archive from the recipient.

8. The method according to claim 1 including registering the access code with the secure server of the transaction archive and authenticating the recipient with the secure server to provide the object with the access code.

9. The method according to claim 8 including transmitting a plurality of objects to the recipient, each object having a respective access code associated therewith and authenticating the recipient with the secure server in the same manner to provide each object received by the recipient with the respective access code.

10. The method according to claim 9 including transmitting the plurality of objects to the recipient from different issuers.

11. The method according to claim 8 including providing the recipient with authenticating information responsive to a successful response by the recipient to a query transmitted to the recipient by the issuer in the form of an enrolment object, and authenticating the recipient with the secure server by requesting the authenticating information from the recipient.

12. The method according to claim 1 including transmitting an object to the recipient which comprises an enrolment object which enrols the recipient with a secure server and provides the recipient with authenticating information responsive to a successful response by the recipient to a query by the enrolment object, and providing the recipient with an access code associated with a subsequently transmitted object upon the secure server subsequently receiving the authentication information from the recipient.

13. The method according to claim 12 including disabling the enrolment object upon providing the recipient with authenticating information.

14. The method according to claim 12 including determining a successful response by the recipient to the query by comparing a response by the recipient to a solution stored both within the enrolment object and on the secure server.

15. The method according to claim 12 including transmitting a plurality of enrolment objects to a plurality of recipients in which each of the recipients receives respective authenticating information from the secure server upon successfully responding to a query, and subsequently providing each of the recipients with an access code to a subsequently transmitted object upon receipt by the secure server of the respective authenticating information.

16. The method according to claim 15 wherein the plurality of recipients commonly receive a subsequently transmitted common object having an access code associated therewith and each of the recipients receives from the secure server the access code to the common object upon receipt of the respective authenticating information.

17. The method according to claim 1 wherein the recipient comprises an organization having a plurality of users and wherein the method includes selecting authorized ones of the users within the organization which are permitted to view the data when the data is encrypted into the object and permitting only the authorized ones of the users to view the data by providing each of the authorized ones of the users with a respective password including identification of a respective portion of the data to be viewed in association therewith.

18. The method according to claim 7 including disabling the object responsive to repeated attempts to enter an invalid password.

* * * * *